(12) United States Patent
Carbone et al.

(10) Patent No.: US 8,704,090 B2
(45) Date of Patent: Apr. 22, 2014

(54) METALLIC FLOOR BOX WITH NON-METALLIC RISER AND FLANGE

(75) Inventors: Christopher A. Carbone, Newtown, CT (US); Dale A. Drechsler, Westbrook, CT (US); Thomas L. Scanzillo, Monroe, CT (US)

(73) Assignee: Hubbell Incorporated, Shelton, CT (US)

( * ) Notice: Subject to any disclaimer, the term of this patent is extended or adjusted under 35 U.S.C. 154(b) by 202 days.

(21) Appl. No.: 12/923,598

(22) Filed: Sep. 29, 2010

(65) Prior Publication Data

US 2011/0017485 A1 Jan. 27, 2011

Related U.S. Application Data

(63) Continuation of application No. 12/073,175, filed on Feb. 29, 2008, now Pat. No. 7,825,335.

(51) Int. Cl.
*H02G 3/08* (2006.01)

(52) U.S. Cl.
USPC .................. 174/50; 174/58; 174/60; 439/535; 248/906

(58) Field of Classification Search
USPC .......... 174/50, 58, 17 R, 60, 64, 53; 248/906; 439/535; 361/600; 220/4.02, 3.6, 3.8; 33/528

See application file for complete search history.

(56) References Cited

U.S. PATENT DOCUMENTS

| | | | | | |
|---|---|---|---|---|---|
| 609,356 | A | * | 8/1898 | Krantz | 220/3.8 |
| 882,337 | A | * | 3/1908 | MoMurtrie | 220/3.7 |
| 4,997,562 | A | * | 3/1991 | Warner | 210/259 |
| 5,852,901 | A | * | 12/1998 | Meyers | 52/20 |
| 6,666,700 | B2 | * | 12/2003 | Kiermaier | 439/242 |
| 7,238,881 | B1 | * | 7/2007 | Barr et al. | 174/50 |

* cited by examiner

*Primary Examiner* — Dhirubhai R Patel
(74) *Attorney, Agent, or Firm* — Kevin M. Barner; Mark S. Bicks; Alfred N. Goodman

(57) ABSTRACT

An in-floor electrical floor-box assembly includes a rectangular or nearly square metallic housing and a non-metallic riser with integral flange assembly having a rectangular flange that mates with the rectangular housing and an integral cylindrical riser for providing access to the electrical components through a round cover and finish flange. A low-voltage divider assembly separates cables carrying different voltages within the riser to reduce interference between the cables and any one of a variety of sub-plates having different configurations for accommodating a variety of multi-service or single service electrical functionality can be incorporated with the box.

15 Claims, 7 Drawing Sheets

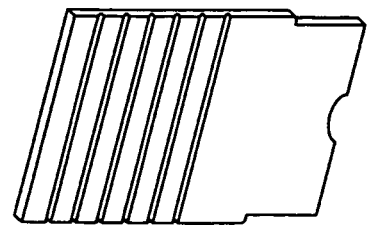
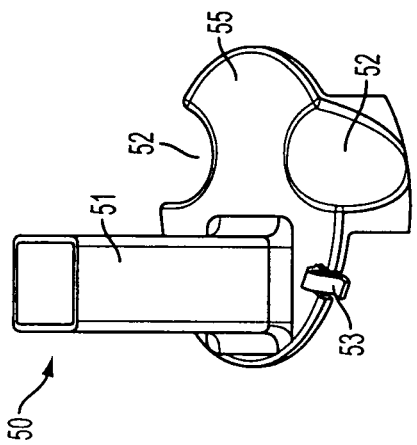
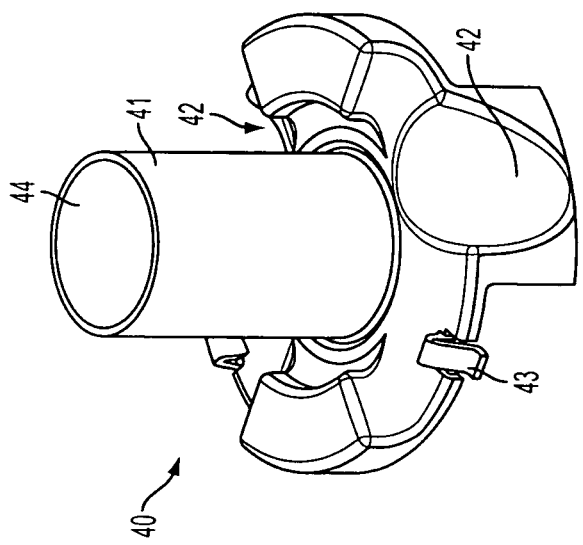

METALLIC FLOOR BOX WITH NON-METALLIC RISER AND FLANGE

CROSS-REFERENCE TO RELATED APPLICATIONS

This application is a continuation of U.S. patent application Ser. No. 12/073,175 filed Feb. 29, 2009, the entire content of which is incorporated herein by reference.

FIELD OF THE INVENTION

This invention relates generally to a floor box for housing electrical power and/or low voltage (data, multi-media, A/V & communications) devices. More particularly, the device relates to a floor box for accommodating electrical power and data distribution devices within a floor.

BACKGROUND OF THE INVENTION

The invention relates in general to electrical in-floor power and communications distribution systems for commercial buildings and the like, and in particular to a metallic floor box with a non-metallic riser that accommodates varying floor material depths and multiple services.

Conventional electrical floor boxes are problematic when used in connection with poured floors, such as concrete floors. One particular type of problem arises because the overall height of the floor box is typically fixed and, thus, if the final height of the poured floor is less than the height of the floor box, the floor box will protrude from the floor. Alternatively, if the planned height of the floor is greater than the overall height of the box, it is necessary to artificially elevate the floor box within the floor when it is installed, for example, using a sub-floor material, and somehow level the sub-floor and/or the box before pouring the floor. Subsequently, if the top of the floor box had not been leveled precisely, the top of the box will not be flush with the top of the poured floor, that is, it would either protrude above the floor or it would be recessed within the floor.

Additionally, various building codes limit the amount and type of electrical wiring and connections that a floor box can contain within a particular volume and other codes require boxes that accommodate multiple services, such as power and data, maintain physical separation between the various services within the box. Therefore, in order to satisfy these requirements, it is necessary to determine the interior volume of the floor-box before the components housed within it can be wired and activated and, further, to maintain separation between various services within the box.

Addressing some of the problems mentioned above, it is known to provide floor-boxes which are set in poured concrete floors and the tops of which are sawed-off to accommodate the depth of the poured floor. One such floor-box is disclosed in U.S. Pat. No. 5,466,886 (the '886 Patent), assigned to the same assignee as the present invention, Hubbell Incorporated. In addition to disclosing a variable height floor-box, the '886 Patent further discloses an electrical outlet box assembly for separating and insulating high voltage power wires from low voltage communication wires. The electrical outlet box assembly includes a non-metallic one-piece tubular housing adapted to be embedded into a poured concrete floor having an electrical shielding assembly coupled within the housing.

One disadvantage to the device disclosed in the '886 Patent, however, is that it comprises a one-piece non-metallic tubular structure for the housing, which is not ideal for certain applications. For example, certain jurisdictions require the use of metal conduit and outlet boxes. That is, according to code in some jurisdictions, non-metallic boxes may be prohibited and termination of metal conduit into a non-metallic box may be cost prohibitive or disallowed by local authorities. In particular, it is often required to utilize EMT (Electrical Metallic Tubing) conduit to carry the wiring and/or cabling to and from the box. Moreover, due to the shape of the locking nut, even if it were permissible to terminate metallic conduit to a non-metallic box, it would be extremely cumbersome to do so, if it were possible at all.

Accordingly, the device disclosed and claimed in accordance with the present invention addresses the above and other disadvantages encountered with related-art floor-boxes.

SUMMARY OF THE INVENTION

Illustrative, non-limiting embodiments of the present invention overcome the aforementioned and other disadvantages associated with related art floor-boxes for housing multi-service electrical components. Also, the present invention is not required to overcome the disadvantages described above and an illustrative non-limiting embodiment of the present invention may not overcome any of the problems described above.

First reason increased volume to rectangular housing for improved wire clearances and bend radius within housing. Second reason is EMT conduit with locknut can only be achieved on rectangular housing or planar surface. This product provides the benefits of a rectangular shape in the floor and then transitions to a round finished surface fitting. The round surface fitting is preferred because it blends with building lines easier and is more aesthetically pleasing. The transition from square housing to round cover is believed to be unique to this product.

According to one aspect of the device, a rectangular metallic floor box is attached to a cylindrical non-metallic riser having an integral flange which attaches to the top of the floor box. The rectangular shape of the box provides for increased wiring clearance and bend radius within the box. Further, EMT conduit with a locknut can easily interface with the planar surface of the rectangular box. The riser transitions from a rectangular flange which attaches to the rectangular box to a cylindrical riser which is completed with a round surface fitting at the floor surface. According to at least one embodiment of the invention, a round surface fitting is desired because it blends with building lines easier and is more aesthetically pleasing than other shapes. It is the transition from rectangular floor box housing to round cover that is believed to be one unique feature of a floor box consistent with the present invention.

Either electrical power devices, electrical data devices, or both, are connected within the floor box to cabling that enters the box via conduit connected to holes in one or more sides of the box. After the floor box is positioned within the floor at the desired location a cap is placed over the top of the riser and concrete is poured over the box and over the flange to the minimum depth of pour of the riser. The cap on top of the riser prevents concrete from spilling into the riser and into the electrical box. After the concrete settles and cures, the riser is cut flush with the hardened concrete floor and the desired sub-plate is installed to the finish flange, which houses the desired power and/or data distribution devices within the box. A selected cover plate is then installed over the sub-plate providing a convenient threshold between the floor, e.g., carpet, hardwood, etc., and the electrical outlet. The cover doors also provide protection to the installed devices when not in use. The cover doors may be secured independently of one another, allowing the user to access some or all of the services located beneath.

Another feature of the Hubbell device is an integral partition located on the riser below the flange. The integral partition eliminates the need for any additional parts for separating the data communications and power cabling within the floor box. Also, the riser with the integral partition can be used with both metallic and non-metallic floor boxes and can also be used with different depth boxes.

One aspect of the present invention is to provide a floor-box device with flexibility to create personal solutions for the most demanding multi-service applications for flush in-floor boxes. More particularly, a wide variety of application sub-plates can be installed on the floor-box to provide the desired flexibility. The truly unique feature of the product is that the application sub-plates, finish flanges and cover plates can be installed on either the Hubbell SystemOne metal floor box (described herein), the non-metallic floor box and or fire rated poke through. Thus simplifying the overall installation, procurement and specification of the devices.

According to one embodiment of the invention, an electrical floor box assembly is provided which includes a metallic box having a bottom portion, a plurality of sides and a top portion, and a non-metallic flange assembly secured to the top portion of the rectangular metallic box and having a flat flange portion with substantially the same dimension as the top portion of the box, and a cylindrical riser with an opening at a top thereof providing access into the box.

As used herein "substantially", "generally", and other words of degree, are used as a relative modifier intended to indicate permissible variation from the characteristic so modified. It is not intended to be limited to the absolute value or characteristic, which it modifies but rather approaching or approximating such a physical or functional characteristic.

BRIEF DESCRIPTION OF THE DRAWINGS

The aspects of the present invention will become more readily apparent by describing in detail illustrative, non-limiting embodiments thereof with reference to the accompanying drawings, in which:

FIGS. 5A-5C are perspective views of three exemplary embodiments of a low-voltage divider used in accordance with an embodiment of the present invention.

DETAILED DESCRIPTION OF ILLUSTRATIVE, NON-LIMITING EMBODIMENTS

Exemplary, non-limiting, embodiments of the present invention are discussed in detail below. While specific configurations and dimensions are discussed to provide a clear understanding, it should be understood that the disclosed dimensions and configurations are provided for illustration purposes only. A person skilled in the relevant art will recognize that other dimensions and configurations may be used without departing from the spirit and scope of the invention.

Figure 1:
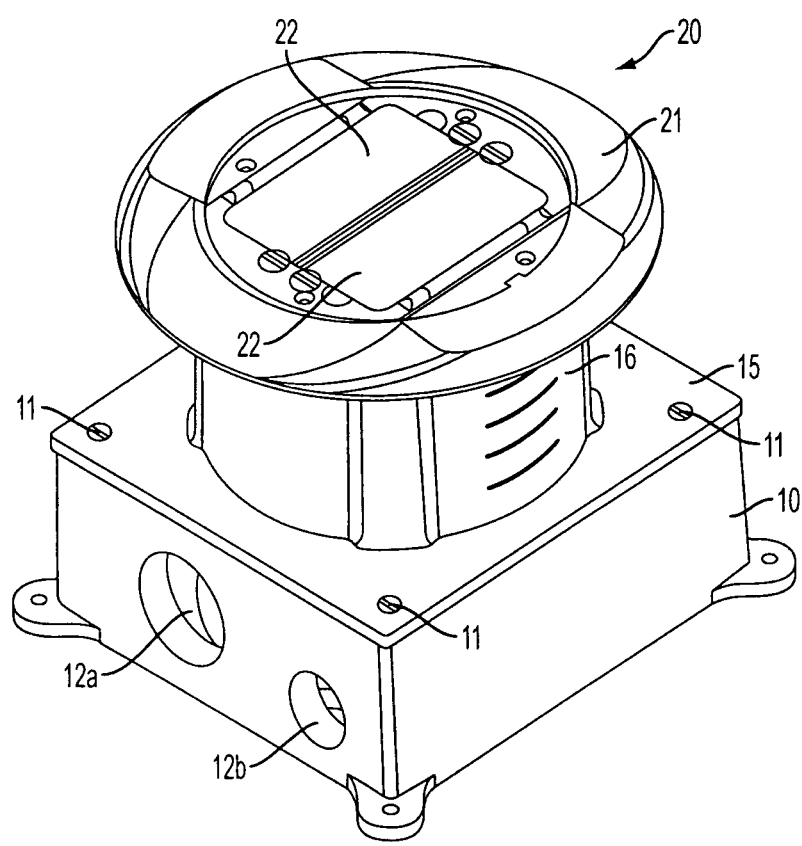
FIG. 1 is a perspective view of one embodiment of a floor-box assembly in accordance with the present invention.

FIG. 1 illustrates an exemplary embodiment of the invention. In particular, the embodiment of FIG. 1 includes a rectangular metallic floor box 10 with a non-metallic riser with integral flange assembly 15 secured to a top thereof. Further, riser with integral flange assembly 15 comprises an integral riser 16 and is secured to the metallic floor box 10 using fasteners 11. According to the embodiment disclosed in FIG. 1 fasteners 11 are screws, however, one of ordinary skill would understand that other types of fastening devices can also be used, such as an adhesive, clamp(s), rivet(s) or other such appropriate mechanisms. Attached to the upper portion of the riser 16 is a cover assembly 20. According to this embodiment, cover assembly 20 comprises a carpet flange 21, but could alternatively include a tile flange (not shown), and cover plate with two hinged doors 22 which provide access to electrical components, e.g., power and/or communications outlets, within box 10 and protect such devices from water, debris, etc. when not in use. Further, when in use, cabling for such electrical components is provided into the box through holes 12a and 12b in the sides of the box. For example, large hole 12a provides access into the box for data cabling or power cabling and smaller hole 12b provides access for power cabling or data cabling.

Floor box 10, according to this embodiment, is made of cast iron, but could be made of other metallic material, as will be described in further detail in accordance with further embodiments. Flange 15 and riser 16 are made of non-metallic material, such as plastic, and can comprise a single integral component where flange 15 and riser 16 are formed together, for example in a molding operation, or they can be formed separately and attached using one or more fastening devices, such as screws, clips, etc.

Figure 2:
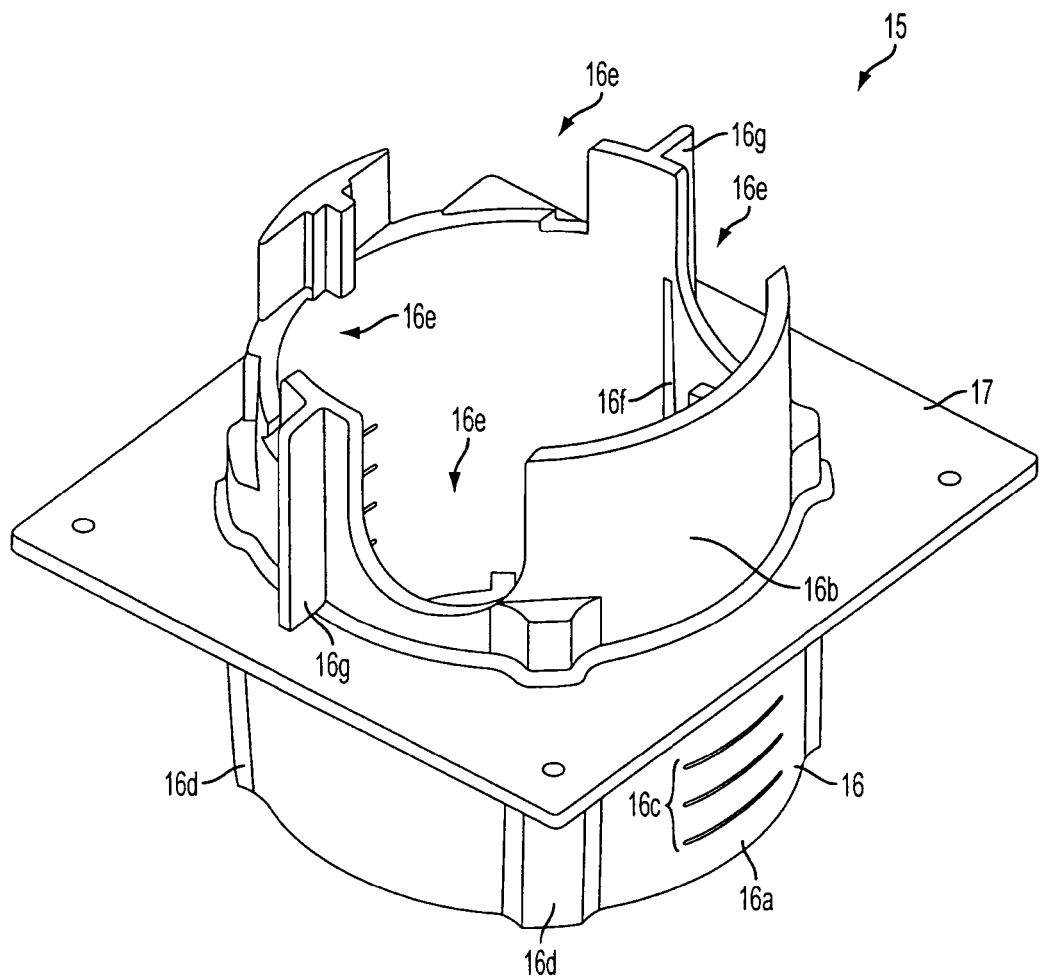
FIG. 2 is a perspective view of a riser with integral flange assembly used in accordance with an embodiment of the present invention.

FIG. 2 is a close-up view of an exemplary embodiment of the riser with integral flange assembly 15, including a integral rectangular ledge portion 17 and cylindrical riser 16. In FIG. 2, riser with integral flange assembly 15 is shown inverted from how it would be oriented when attached to a floor box, such as metallic floor box 10 shown in FIG. 1. Riser 16 further comprises an upper portion 16a and a lower portion 16b. The flange assembly is shown in inverted fashion in FIG. 2 to provide a clear view of the lower portion 16b of the riser. Lower portion 16b would be located within box 10 and obscured from view when flange assembly 15 is attached to the box and upper portion 16a would be outside box 10, as shown in FIG. 1. The cylindrical shape of the riser allows a round finish flange and cover to be installed at the finished floor level, which is desirable because coordinating the orientation of the cover with building walls and architectural features is not typically a concern with the round shape.

As shown in FIG. 2, upper portion 16a of flange assembly 15 includes gradation marks 16c formed integral with the outer surface of the cylindrical riser. As will be described in more detail below, gradation marks 16c indicate the depth of concrete pour (inches [mm]) around the box 10 and riser 16. The gradation marks on the inside wall of 16 indicate the volume displaced by the box 10 and riser 16 and are either permanently formed in the inside wall or are provided via a label under circumstances where the volume may vary. For example, a label may be used because the total volumes differ between a stamped steel box and a cast iron box. As described in more detail below, the upper portion 16a of riser 16 also includes channels 16d for receiving attachment devices (not shown), such as clips, for securing a flooring flange (not shown) to the top of the riser.

Lower portion 16b of riser 16 includes cutouts 16e which enable power and/or data cabling to enter the inside of the riser. For example, cabling (not shown) enters box 10 through holes 12a and/or 12b in the side of box 10 (FIG. 1) and then enters the inside of cylindrical riser 16 through holes 16e. Additionally, integral divider or partition portions 16g protrude from the outer surface of the lower portion 16b of the riser. Protrusions, integral divider or partition 16g align with corresponding protrusions within the interior of the metallic housing and provide isolation around the exterior of the riser between the two sides of the interior of the housing when the riser with integral flange assembly is attached to the housing. Also, according to a further embodiment of the invention, the integral dividers (e.g., protrusions) on the outside of the lower portion 16b of the riser are asymmetrical on the riser; that is, they are not located 180 degrees from each other on the surface of the riser. Accordingly, the orientation of the riser with integral flange can only be assembled to the metallic housing one way, thus providing ease of assembly for the installer so orientation of riser to the metallic box is always the same.

Figure 3B:
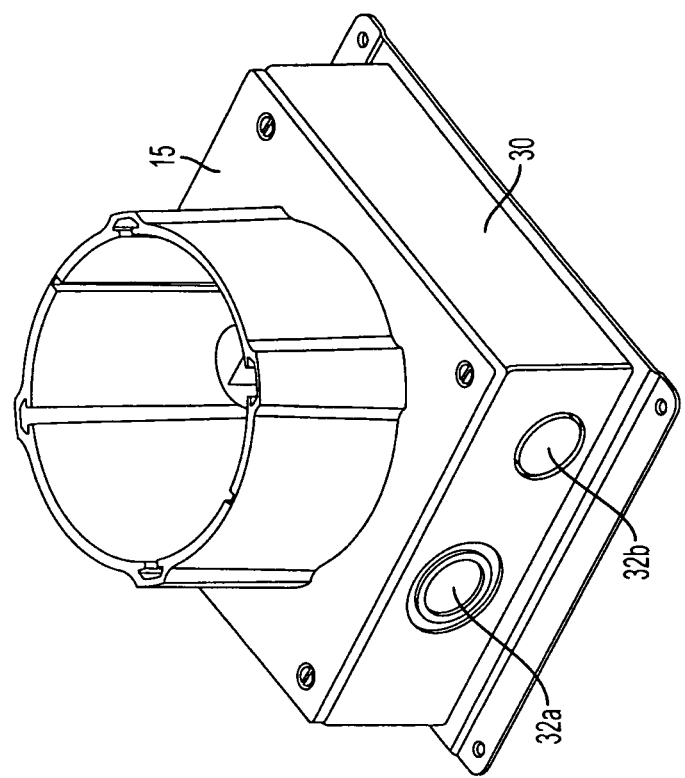
FIGS. 3A and 3B are, respectively, perspective views of a cast iron housing with the riser with integral flange assembly of FIG. 2, and a stamped steel housing with the riser with integral flange assembly of FIG. 2, in accordance with an embodiment of the present invention.
Figure 3A:
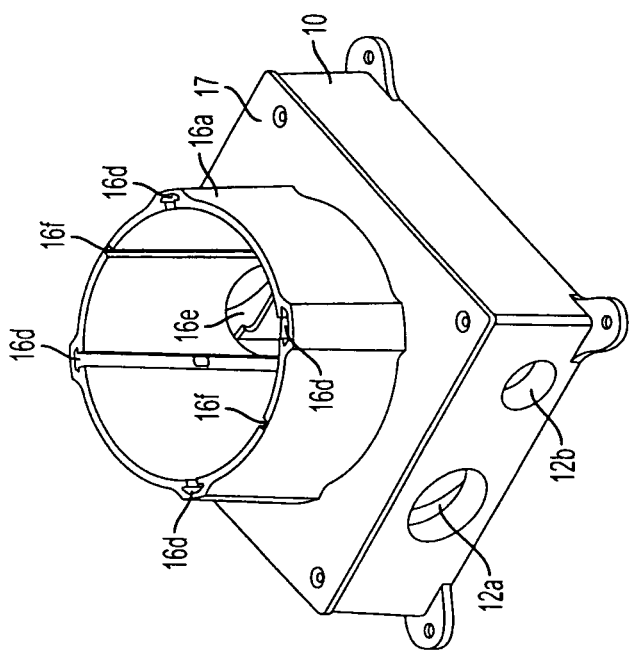

FIG. 3A is a further illustration of the floor box 10 and riser with integral flange assembly 15 shown in FIG. 1. In particular, FIG. 3A shows the rectangular ledge portion 17 of riser with integral flange assembly 15 attached to box 10. Cylindrical upper portion 16a of the riser is exposed above the box and cylindrical lower portion 16b of the riser is obscured from view as it is inside box 10. One of the holes 16e in the sides of the lower portion 16b of the riser is visible through the inside of upper portion 16a. Additionally, an exemplary shape of channels 16d in the sides of the upper portion 16a of the riser can also be seen, slots 16f on opposing inside surfaces of the riser are also illustrated in FIG. 3A. Slots 16f are provided in accordance with an exemplary embodiment to accommodate a planar divider or partition, described later, which is optionally inserted into the slots 16f to divide the inside volume of the upper and lower portions of the riser into two separate spaces. Accordingly, cabling entering into the box 10 through holes 12a, 12b, can be isolated from each other within the riser to eliminate undesirable interference, or crosstalk, between conductors, such as between power and data cables.

FIG. 3B is a further embodiment of the floor box and riser with integral flange in accordance with the invention. More particularly, box 30 in accordance with this embodiment is made of steel, or other sheeted metallic material, such as aluminum. The embodiment shown in FIG. 3B also includes a flange assembly 15. Flange assembly 15 is identical to flange assembly 15 in FIGS. 1, 2 and 3A and, thus, will not be discussed further in accordance with the present embodiment. Box 30 includes knockouts 32a, e.g., concentric knockouts that are 1¼ in., 1 in., and ¾ in. and knockouts 32b, e.g., concentric knockouts that are 1 in., and ¾ in., for accommodating data and power cabling, respectively. In accordance with one exemplary embodiment, knockouts 32a and 32b are provided by perforating areas of material in one or more sides of box 30. Accordingly, the material bounded by the perforations can be easily removed when necessary to provide access to the interior of the box.

Figure 4B:
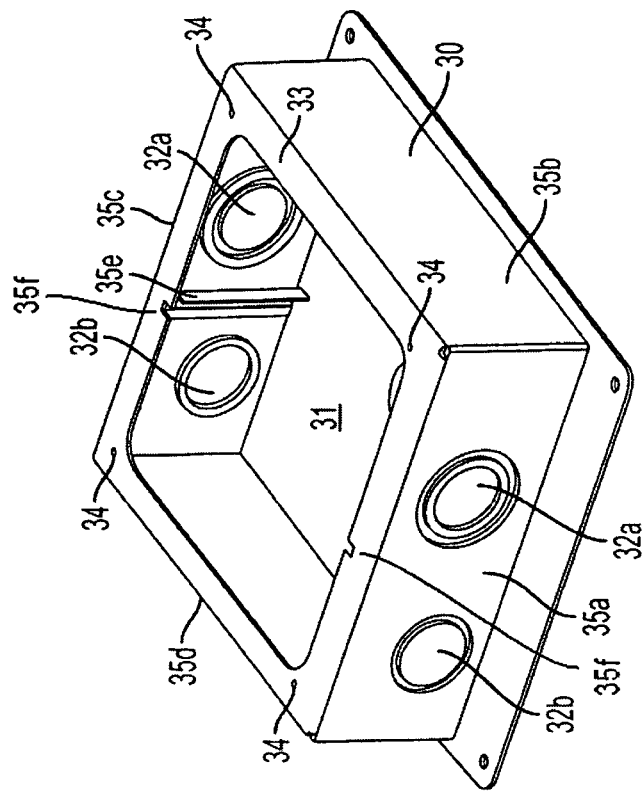
FIGS. 4A and 4B are, respectively, perspective views of a cast iron housing and a stamped steel housing in accordance with an embodiment of the present invention.
Figure 4A:
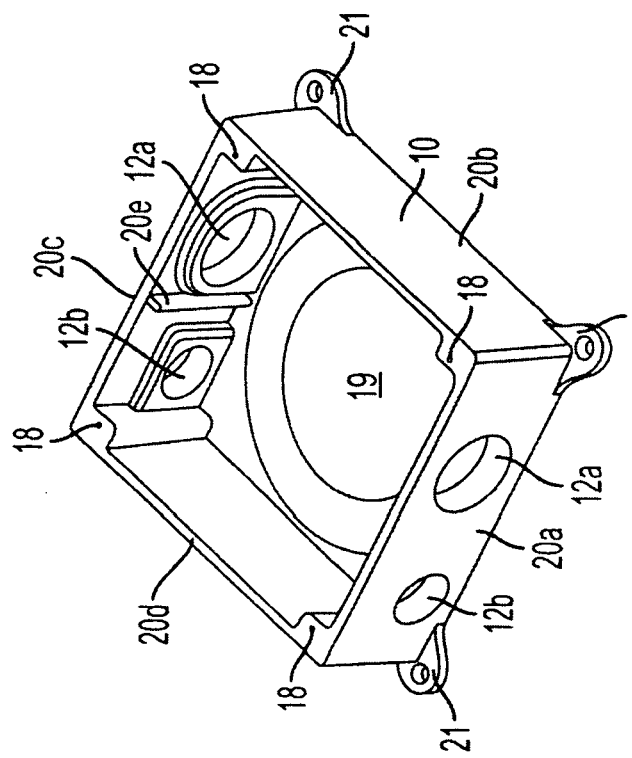

FIGS. 4A and 4B are perspective views of floor boxes consistent with boxes 10 and 30 described above in accordance with FIGS. 1, 3A and 3B. In particular, FIG. 4A is a perspective view of a cast iron box similar to box 10 and FIG. 4B is a perspective view of a stamped metallic, e.g., steel, box similar to box 30. As shown in FIG. 4A box 10 comprises a cast iron enclosure with an integral bottom surface 19 and four integral sides 20a-20d. Opposing sides 20a and 20c are further provided with threaded holes 12a and 12b and divider or partition protrusions 20e. Protrusions 20e align with corresponding protrusions 16g in the lower portion of the riser, as described above in reference to FIG. 2.

Also, as described previously, holes 12a provide access to the interior of box 10 for cables, such as power cables, and threaded holes 12b provide access for cables, such as data cables. As described in more detail below, threaded holes 12a and 12b in sides 20a and 20c of box 10 directly oppose their respective counterpart in order to accommodate electrical isolation between the power and data cables. Threaded holes 12a and 12b can be the same or different sizes and shapes, depending on the size and/or number of cables required to pass through the holes. Further, in accordance with the present embodiment, the inner surface of holes 12a and 12b are threaded to enable threaded conduit or metallic conduit to be screwed into the holes for attaching the power and/or data cabling.

At each of the four the corners of box 10 are provided screw holes 18 and anchor rings 21. Screw holes 18 are threaded holes for receiving screws 11, as described above in accordance with FIG. 1. Anchor rings 21 are integral with the enclosure of box 10 and are provided for securing the box enclosure to a subfloor, such as a concrete floor, pad, gravel or dirt using screws, bolts, or some other appropriate fastening device. These screws are also used to level the box prior to the concrete pour.

FIG. 4B is a perspective view of a sheet metal box similar to the steel box 30 shown in FIG. 3B. This sheet metal box may also be provided with a corrosion resistant finish, such as epoxy paint for use in on-grade applications. As shown, box 30 comprises a steel enclosure with a bottom surface 31, four sides 35a-35d and a top surface 33. Sides 35a and 35c each include knockouts 32a and 32b as described above in regard to FIG. 3B and protrusions (divider or partition) 35e on the respective inside surfaces of the sides. Protrusions 35e and notches 35f align with corresponding protrusions 16g in the lower portion of the riser, as described above in reference to FIG. 2. Each of the surfaces of the enclosure is made of stamped steel and the enclosure surfaces are welded together and/or attached using rivets or some other appropriate fastening device. According to the embodiment shown, bottom surface 31 is rectangular and has a dimension larger than the dimension created by the four sides 32a-32d. Also, top surface 33 has a large rectangular opening provided in its center such that a ledge is provided around the circumference of the enclosure. In the ledge portion of the top surface 33 are provided four holes 34 located at each corner for receiving screws or some other appropriate fastening device for attaching a riser with integral flange assembly, such as riser with integral flange assembly 15 (FIG. 2), thereto. In accordance with a further aspect of this embodiment an optional fusion-bonded epoxy corrosion resistant paint finish is applied to the stamped steel floor box to allow for slab-on-grade use similar to the cast iron box but without the weight of cast iron.

FIGS. 5A-5C are perspective views of three respective exemplary dividers or partitions which can be used in accordance with the floor box of the present invention. That is, dividers or partitions 5A-5C can each be optionally used in conjunction with the previous embodiments described above for the floor boxes and flange assembly.

Divider assembly 40, shown in FIG. 5A, is a divider for isolating, for example, power cables and data cables within a floor box and flange assembly in accordance with the present invention. For example, divider assembly 40 is a unitary piece of non-conductive material with a generally cylindrical shape having a cylindrical tube through its center. According to this particular example, data cables are maintained outside tube 41 and power cables are placed up through tube 41. In this manner tube 41 separates power and data cables within flange assembly 15, as seen more clearly in FIG. 6. More particularly, as described in further detail below, cable ramps 42 of divider assembly 40 align with holes 12a of box 10 when the divider assembly is placed within the box. Data cables, such as CAT-6 cables, placed through holes 12a are then enabled to use the cable ramps 42, which maintain proper bend radius and enter the space within flange assembly 15 between the inside surface of the upper portion of the riser and the outside surface of tube 41. Power cables entering the box using holes 12b, on the other hand, do not use the cable ramps 42 and instead are snaked up through the center section 44 of tube 41.

FIG. 5B illustrates a further exemplary embodiment of a divider assembly. In particular, the divider assembly 50 shown in FIG. 5B includes a rectangular tube 51 located near the outer edge of platform section 55 of the divider assembly 50. A divider assembly with a rectangular wiring separating tube is desirable under certain circumstances, such as when the mating sub-plate that attaches to the upper portion of the riser so requires. Platform section 55 according to this embodiment is circular and includes two cable ramps 52 attached to the underside of the platform and a rectangular tube 51 arising from the top side of the platform. Cable ramps 52, which maintain proper bend radius of low voltage cables are located on one side of platform 55, e.g., shown on the right side of platform 55 in FIG. 5B, and tube 51 is located on the other side, e.g., on the left side of platform 55.

FIG. 5C illustrates a further type of divider assembly in accordance with the present invention. More particularly, planar divider or partition 60 is flat and separates the inner volume of the flange assembly 15 and floor box, 10 or 30, into separate regions. For example, planar divider or partition 60 is inserted into slots 16f of flange assembly 15, as shown in FIG. 3A, thus, dividing the inside of the riser portions of the flange assembly into two separate sections. Further, within box 10 or 30, divider 60 separates the inner space of the box into two corresponding sections, e.g., in accordance with the cast iron box embodiment of FIG. 3A, one side includes holes 12a and the other side includes holes 12b. Thus, data cables provided through holes 12a are separated from power cables provided through holes 12b.

Figure 6:
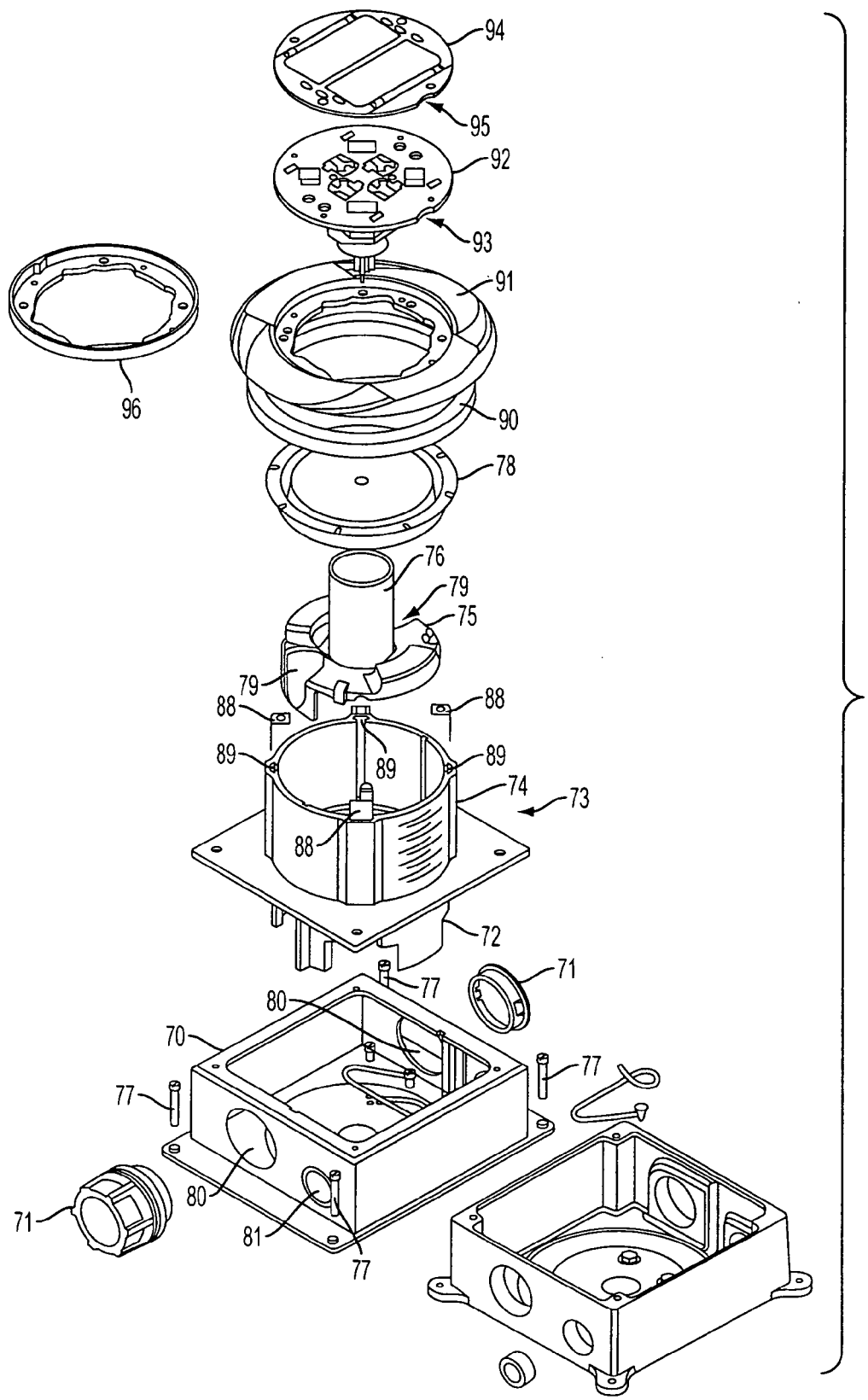
FIG. 6 is an exploded view of a floor-box assembly with a tubular low-voltage divider in accordance with an exemplary embodiment of the present invention.

FIG. 6 is an exploded view illustrating an exemplary assembly in accordance with one embodiment of the invention, including riser with integral flange assembly 15, divider 40 and steel box 30. An alternative cast iron box 10 is also shown in FIG. 6 and can be used in place of box 30, depending on electrical and structural requirements of the particular application.

Referring to FIG. 6, the following is an exemplary procedure for installing a floor box and riser with integral flange assembly in accordance with the present invention. More particularly, the following is an exemplary installation procedure for installing a floor box within a concrete floor.

Specifically, before the concrete is poured, the following steps are followed;

1. Connect threaded conduit hub 71, if required, through which power and/or data cables are run. For example, conduit hub 71 must be used on stamp steel for 1½ in. opening or data side but for cast iron floor box applications hub 71 is not required. Further, seal off unused openings in the sides of the enclosure 70 with reducing bushing or closure plugs (not shown) to seal the inner volume of the box 70 so wet concrete does not infiltrate the box.

2. Run the cables (not shown) through the respective holes (e.g., holes 16f in FIG. 2) in the lower riser portion 72 of flange assembly 73.

3. Level floor box 70 using leveling screws 77.

4. Secure floor box 70, for example, with leveling screws 77, to keep the box from moving during concrete pour.

5. Secure concrete cover 78 to the opening at the top of the upper portion 74 of the riser, thus sealing the flange assembly 73 and box 70. If necessary, cover any visible openings, for example, with duct tape or some other suitable removable sealing means.

6. Pour the concrete to form the floor in which the floor box 70 and flange assembly will reside. The upper portion 74 of the riser should protrude above the finished concrete floor.

Subsequently, after the concrete has cured, the following steps should be followed in accordance with this exemplary embodiment;

7. Remove the concrete cover 78 from the top of the upper portion 74 of the riser.

8. To serve a finished floor thickness of ⅜ in., cut the upper portion 74 of the riser flush with the rough concrete floor. For a finished floor thickness in excess of ⅜ in. cut the riser at a height above the rough concrete floor corresponding to the finished floor thickness. Record the height of the riser that is cut away, this amount will need to be cut from the low voltage divider assembly 75.

9. Remove any debris from within box 70.

10. Cut off the same amount cut from the upper portion 74 of the riser in step 8 from the tube portion 76 of the divider assembly 75.

11. Snake the power cable(s) from within the box 70 up through the inside of tube 76 of divider 75 and align cable ramps 79 with the conduit openings 80 in box 70 intended for data cabling. Secure the low voltage divider 75 within the flange assembly 73.

12. Snake data/communication cable(s) up over ramps 79 and keep cable(s) outside of the tube 76 of low voltage divider 75.

Figure 7:
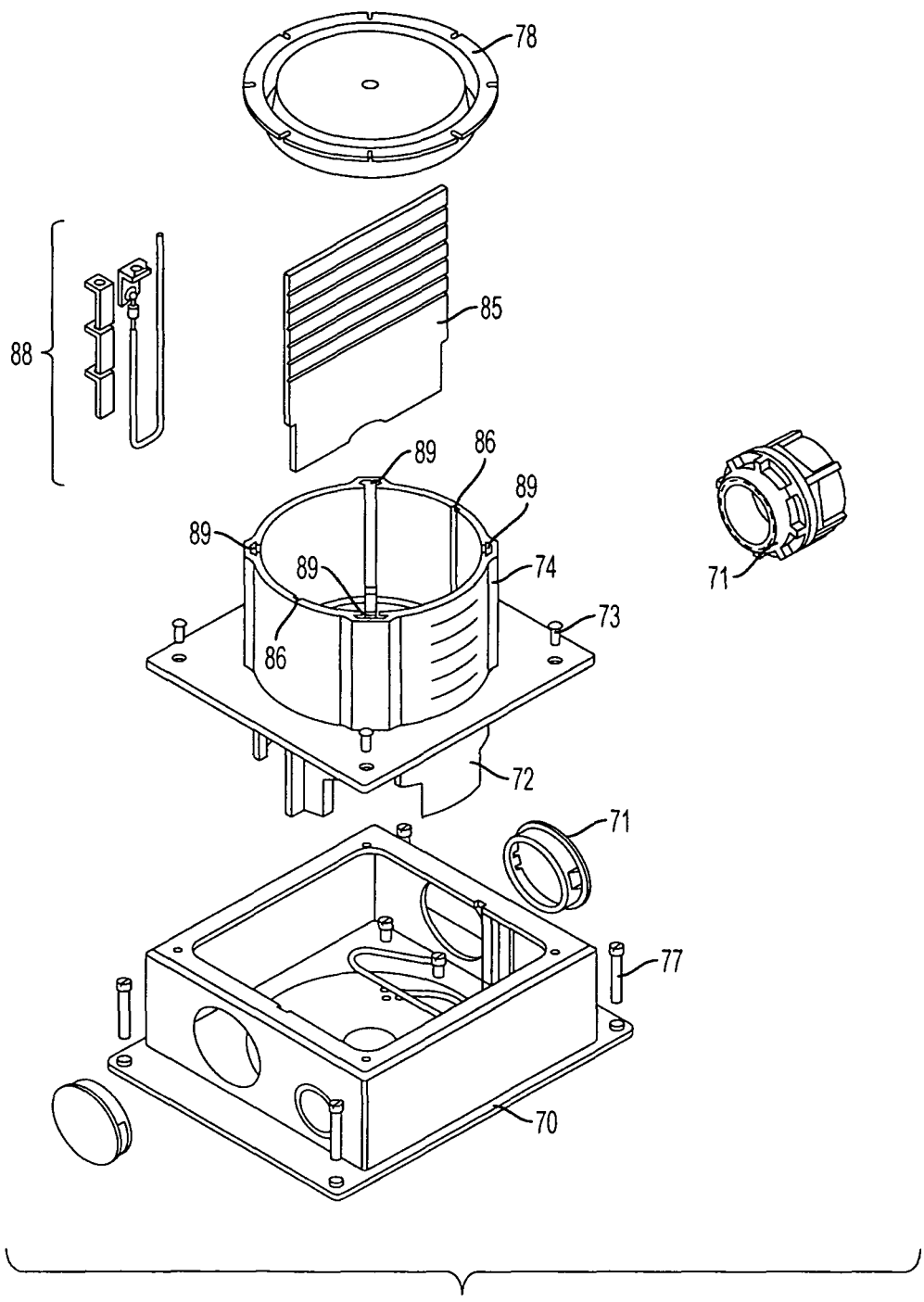
FIG. 7 is an exploded view of a floor-box assembly with a planar low-voltage divider in accordance with an exemplary embodiment of the present invention.

13. In situations where a planar divider or partition is used, such as described in connection with FIG. 5C, refer to FIG. 7. In this embodiment, planar low voltage divider or partition 85 is inserted into vertical slots 86 on the inner surface of the upper and lower portions 74, 72 of the flange assembly 73.

14. Install barbed clips 88 into channels 89 at the top of the upper riser portion 74 of flange assembly 73.

The following procedure is for carpet and tile applications, i.e., where carpet or tile covers the floor in which the floor box is installed.

15. If carpet installation, trim the carpet opening approximately ¼-inch bigger than floor box opening, e.g., the outer diameter of the upper riser portion 74.

16. Place gasket 90 or, alternatively, apply a bead of clear silicon type RTV sealant, around the top of the upper riser portion 74 of flange assembly 73 and, if carpet installation, on the underside of carpet flange 91 to seal the inside of the flange assembly and box from water and other contaminants.

17. If carpet installation, secure the carpet flange 91 onto metal clips 88 using screws or some other suitable fastener. If tile installation, secure tile flange 96 onto metal clips 88.

18. Install sub-plate 92 onto carpet flange 91, for example using an optional gasket (not shown) to block entry of scrub water, by aligning notch 93 in sub-plate 92 with bump (not shown) on carpet flange 91 or tile flange 96.

19. Connect power and data conductors to the appropriate connectors on sub-plate 92.

20. Install floor box cover assembly 94, with integral gasket and bi-fold doors (22 in FIG. 1) which further include an integral gasket around outside edge of the doors 22, onto sub-plate 92 by aligning notch 95 in cover assembly 94 with the bump (not shown) in the carpet flange 91 or tile flange 96. Fasten cover 94, sub-plate 92 and carpet flange 91, or tile flange 96, together with screws or some other suitable fastener.

While various aspects of the present invention have been particularly shown and described with reference to the exemplary, non-limiting, embodiments above, it will be understood by those skilled in the art that various additional aspects and embodiments may be contemplated without departing from the spirit and scope of the present invention. For example, a skilled artisan would understand that sub-plate 92 described in reference to FIG. 6 is not limited to any particular configuration of data and power connections. Any sub-plate configuration can be used in accordance with the invention disclosed, including a sub-plate with one or more power connections and/or one or more data connections.

It would be understood that a device or method incorporating any of the additional or alternative details mentioned above would fall within the scope of the present invention as determined based upon the claims below and any equivalents thereof.

Other aspects, objects and advantages of the present invention can be obtained from a study of the drawings, the disclosure and the appended claims.

What is claimed is:

1. An electrical floor box comprising:
   a rectangular metallic box having a bottom portion, a plurality of sides and a top surface;
   a non-metallic cylindrical riser having a flange that substantially surrounds an outer surface thereof and is secured to the top surface of said rectangular metallic box, said cylindrical riser having an opening at a top thereof providing access into said rectangular metallic box; and
   a cover disposed at an end of said non-metallic cylindrical riser opposite said flange and including a door that opens and closes and provides access to an inner area of said riser when said door is open.

2. The electrical floor box claimed in claim 1, wherein said non-metallic cylindrical riser includes a hollow tubular portion and the flange is adjacent to an outer surface of the hollow tubular portion and is perpendicular to the hollow tubular portion.

3. The electrical floor box claimed in claim 2, wherein said non-metallic cylindrical riser further includes a lower portion below the hollow tubular portion and the lower portion is disposed within the electrical floor box when said flange of said non-metallic riser is secured to the top surface of said rectangular metallic box.

4. The electrical floor box claimed in claim 3, wherein the lower portion of the non-metallic cylindrical riser includes at least one opening for receiving at least one electrical cable carrying power or data for either dual-service or single service application.

5. The electrical floor box claimed in claim 2, wherein the flange of said non-metallic cylindrical riser is formed integrally with the hollow tubular portion.

6. The electrical floor box claimed in claim 3, wherein the upper and lower portions of the riser comprise a plurality of channels disposed vertically on the inside surface of the riser.

7. The electrical floor box claimed in claim 1, wherein said cover is circular.

8. The electrical floor box claimed in claim 1, further comprising a low-voltage partition to separate power cables from data cables.

9. The electrical floor box claimed in claim 8, wherein said low-voltage divider comprises:
   a substantially flat platform having a dimension substantially the same as an inner dimension of the riser;
   at least one ramp disposed below said platform; and
   a tube disposed above said platform.

10. The electrical floor box claimed in claim 9, wherein a lowermost portion of the at least one ramp contacts the bottom portion of said rectangular metallic box and an uppermost portion of the at least one ramp contacts the platform of said divider.

11. The electrical floor box claimed in claim 9, wherein the power cables run through said tube and the data cables are disposed outside of said tube.

12. The electrical floor box claimed in claim 1, wherein the flange of said non-metallic cylindrical riser is substantially the same dimension as the top surface of said rectangular metallic box.

13. The electrical floor box claimed in claim 1, wherein said rectangular metallic box is made of cast iron and the bottom portion, the sides and the top surface are integral.

14. The electrical floor box claimed in claim 1, wherein said rectangular metallic box is made of stamped steel.

15. The electrical floor box claimed in claim 1, further comprising markings disposed on the inside of said riser, said markings being indicative of the volumetric capacity within the floor box assembly.

\* \* \* \* \*